United States Patent
Kieferndorf et al.

(10) Patent No.: US 12,165,819 B2
(45) Date of Patent: Dec. 10, 2024

(54) CONTROL SCHEME FOR THE OPERATION OF AN ELECTRIC MOTOR ACTUATOR FOR A MEDIUM TO HIGH VOLTAGE CIRCUIT BREAKER

(71) Applicant: Hitachi Energy Ltd, Zürich (CH)

(72) Inventors: Frederick Kieferndorf, Baden (CH); Joerg Lehmann, Basel (CH); Stefano Mattei, Zurich (CH)

(73) Assignee: Hitachi Energy Ltd, Zürich (CH)

( * ) Notice: Subject to any disclaimer, the term of this patent is extended or adjusted under 35 U.S.C. 154(b) by 182 days.

(21) Appl. No.: 17/791,234

(22) PCT Filed: Jan. 5, 2021

(86) PCT No.: PCT/EP2021/050079
§ 371 (c)(1),
(2) Date: Jul. 7, 2022

(87) PCT Pub. No.: WO2021/140098
PCT Pub. Date: Jul. 15, 2021

(65) Prior Publication Data
US 2023/0352255 A1    Nov. 2, 2023

(30) Foreign Application Priority Data

Jan. 7, 2020  (EP) .................................. 20150551

(51) Int. Cl.
*H01H 1/20* (2006.01)
*H01H 33/42* (2006.01)
*H01H 33/59* (2006.01)

(52) U.S. Cl.
CPC .......... *H01H 33/42* (2013.01); *H01H 1/2058* (2013.01); *H01H 33/59* (2013.01)

(58) Field of Classification Search
CPC ...... H01H 33/42; H01H 33/59; H01H 33/593; H01H 1/2058; H01H 9/56; H01H 2009/566; H02P 27/06; H02P 27/085
(Continued)

(56) References Cited

U.S. PATENT DOCUMENTS 5,119,260 A * 6/1992 Huhse .................. H01H 33/666
                                          361/93.6
7,898,788 B2 * 3/2011 Bataille .................. H01H 47/22
                                          361/152
(Continued)

FOREIGN PATENT DOCUMENTS

DE      3905822 A1    8/1990
DE  102018102503 B3    3/2019
(Continued)

OTHER PUBLICATIONS

Office Action, Japanese Patent Application No. 2022-541889, mailed Aug. 25, 2023, 14 pages.
(Continued)

*Primary Examiner* — William A Bolton
(74) *Attorney, Agent, or Firm* — Sage Patent Group

(57) ABSTRACT

The present disclosure provides a contact actuating unit for an electrical circuit breaker. The contact actuating unit includes an electro-mechanical device. An actuator of the electro-mechanical device is connected to a contact arrangement in the electrical circuit breaker. The contact actuating unit further comprises a control unit. The control unit is configured to control the electro-mechanical device to move the actuator and to bring the contact arrangement from a first to a second position.

The contact actuating unit further includes a command feed forward or motion trajectory and feed forward controller, configured to provide one or more data signals. At least one of the provided data signals is indicative of a predetermined
(Continued)

force and/or torque value, adapted to command the control unit to move the contact arrangement with the actuator to a predetermined position.

20 Claims, 4 Drawing Sheets

(58) Field of Classification Search
USPC .................................. 218/154, 155, 153, 122
See application file for complete search history.

(56) References Cited

U.S. PATENT DOCUMENTS

| | | | | |
|---|---|---|---|---|
| 8,212,423 | B2* | 7/2012 | Saito | H01H 9/56 307/127 |
| 8,304,676 | B2* | 11/2012 | Uchii | H01H 33/56 218/85 |
| 8,927,893 | B2* | 1/2015 | Kim | H01H 3/40 218/72 |
| 8,972,064 | B2* | 3/2015 | Grabinger | F24F 11/00 165/200 |
| 9,899,172 | B2* | 2/2018 | Urai | H01H 33/38 |
| 9,959,999 | B2* | 5/2018 | Adachi | H01H 33/36 |
| 2014/0146422 | A1* | 5/2014 | Nomura | H01H 33/16 361/4 |
| 2015/0355647 | A1* | 12/2015 | Bitterolf | B25J 9/1638 700/275 |
| 2018/0082816 | A1* | 3/2018 | Herrmann | H01H 33/59 |
| 2018/0152123 | A1 | 5/2018 | Zhang et al. | |
| 2019/0049515 | A1* | 2/2019 | Eickhorn | G08B 29/123 |
| 2019/0325663 | A1* | 10/2019 | Brim | G07C 3/02 |

FOREIGN PATENT DOCUMENTS

| | | |
|---|---|---|
| EP | 3822999 A1 | 5/2021 |
| JP | S60263206 A | 12/1985 |
| JP | H11176293 A | 7/1999 |
| JP | 2007311345 A | 11/2007 |
| JP | 2009289566 A | 12/2009 |
| JP | 2016072064 A | 5/2016 |
| WO | 2015033458 A1 | 3/2015 |

OTHER PUBLICATIONS

International Search Report and Written Opinion of the International Searching Authority, PCT/EP2021/050079, mailed Mar. 30, 2021, 11 pages.
Johnson, C., et al., "Experimental Identification of Friction and Its Compensation in Precise, Position Controlled Mechanisms," IEEE Transactions On Industry Applications, vol. 28, No. 6, Nov. / Dec. 1992, 7 pages.
Lorenz, R., et al., "Synchronized Motion Control for Process Automation," Conference Record of the IEEE Industry Applications Society Annual Meeting, San Diego, CA, USA, Oct. 1-5, 1989, 6 pages.
European Patent Application No. 20150551.8, Communication Pursuant to Article 94(3) EPC, mailed Feb. 8, 2023, 6 pages.

* cited by examiner

CONTROL SCHEME FOR THE OPERATION OF AN ELECTRIC MOTOR ACTUATOR FOR A MEDIUM TO HIGH VOLTAGE CIRCUIT BREAKER

CROSS REFERENCE TO RELATED APPLICATIONS

This application is a 35 U.S.C. § 371 national stage application of PCT International Application No. PCT/EP2021/050079 filed on Jan. 5, 2021, which in turns claims foreign priority to European Patent Application No. 20150551.8, filed on Jan. 7, 2020, the disclosures and content of which are incorporated by reference herein in their entirety.

FIELD OF INVENTION

The disclosure relates to the field of electrical switching devices, for example load break switches or circuit breakers (CB), in particular for a high or medium voltage circuit breaker (HVCB, MVCB). In particular, the application concerns an electrically driven actuator for an electrical switching device.

BACKGROUND OF INVENTION

Electrical switching devices, for example load break switches or circuit breakers (CB), in particular for a high or medium voltage circuit breaker (HVCB, MVCB), may constitute an integral part of units assigned to the task of switching load and/or fault currents, with typical values being in a range of 1 kA to 300 kA root mean square. The electrical switching device is opened or closed by a relative movement of contacts.

The present disclosure may relate to a high- and medium-voltage circuit breaker device for voltages greater than, e.g., 1000 Volt.

It is known that electrical operations, both for interruption and for connection/disconnection, in high- and medium-voltage switchgear devices may be performed by moving a contact in a contact arrangement. This is done by an actuation system for performing the electrical operation.

For interruption and connection/disconnection operations, the actuation devices most frequently used in the conventional systems of load break switches may be of mechanical or hydraulic type.

Mechanical actuation devices may generally require complicated kinematic systems for transmitting force to the moving contact to actuate it. Additionally, complicated adjustment processes may be necessary, because a travel curve/motion trajectory of the moving contact may be determined exclusively by the mechanical characteristics of the involved structural elements and cannot be changed by the user. These characteristics may be mostly set during the design of the electrical switching device or the contact arrangement.

Because of the presence of complicated kinematic chains, the response time of such a contact arrangement is relatively long. In order to achieve shorter response times, it may be necessary to provide considerably more energy than required to move the single movable mechanical element.

Moreover, said travel curve/motion trajectory can vary over time due to the wear of single components, leading to a degradation in performance and therefore to the need to perform a large number of maintenance interventions in order to maintain the nominal behavior of the actuation system.

Hydraulic-type actuation devices have improved these problems partially but have several other drawbacks due to the presence of fluids and most of all to a sensitivity of said fluids to temperature variations.

Some switching devices use, for the electrical operations, actuation and control systems comprising electric motors which may be automatically triggered or may be manually actuated by an operator. Powerful motor drives, recently introduced as actuators, have shown great promise as reliable, cheaper and customizable alternatives to traditional spring or pneumatic arrangements.

In currently known motor driven systems, generic position feedback controls have been put forward. One of the known systems may employ a control scheme based on cascaded, proportional-Integral (PI) feedback loops for position, velocity and current.

Parameters of these PI controllers may have to be adjusted ad-hoc, requiring a trial and error procedure to reach a desired travel curve of the switching contacts in the contact arrangement.

This may, however, pose several limitations to fully exploit the flexibility of the motor drive. For example, the feedback control has inherent delays that make a direct, continuous adjustment of the control references infeasible. Another drawback may be that an operation in current control defines the travel curve in an indirect, hard to predict manner, thus its adjustment requires significant time and iterations. Furthermore, the travel curve cannot readily be adapted to different fault conditions.

Therefore, despite fulfilling their task, even these actuation and control systems are characterized, like the previously described ones, by a lack of control over the motion trajectory of the mechanical element that they move. Lack of control over the travel curve/motion trajectory, both during the interruption operation and during the disconnection operation, may require the presence of stroke limiting devices in order to limit the movement of the moving contact and the presence of shock absorbers or dampers in order to dissipate the residual kinetic energy at the end of the operation.

Because of lack of control over the travel curve/motion trajectory, the positioning of the moving contact itself is inaccurate and can lead to early wear of the mechanical parts affected by the electrical operation.

Moreover, a lack of control over the travel curve/motion trajectory during the interruption, connection and disconnection operations makes it difficult to coordinate them correctly. This may require several interventions, with a considerable increase in the time required to complete the operation.

An object of the disclosure is therefore to provide an improved way to operate a contact arrangement in a circuit breaker with a predefined switching behavior to overcome the previously presented drawbacks of the known devices.

SUMMARY OF INVENTION

In order to address the foregoing and other potential problems, embodiments of the present disclosure propose one or more of the following aspects.

In an aspect of the present disclosure, a contact actuating unit for an electrical circuit breaker is provided. The contact actuating unit may comprise: an electric drive, wherein an actuator of the electric drive is connected to a contact arrangement in the electrical circuit breaker.

The contact actuating unit may further comprise a control unit. The control unit may be configured to control the electric drive to move the actuator and to bring the contact arrangement from a first to a second position. The contact actuating unit may further comprise a motion trajectory and feed forward controller, configured to provide one or more data signals, wherein at least one of the provided data signals is indicative of a predetermined force and/or torque value, adapted to command the control unit to move the contact arrangement with the actuator to a predetermined position.

BRIEF DESCRIPTION OF DRAWINGS

Embodiments of the present disclosure will be presented in the sense of examples and their advantages are explained in greater detail below, with reference to the accompanying drawings, wherein.

DETAILED DESCRIPTION OF EMBODIMENTS

Figure 1:
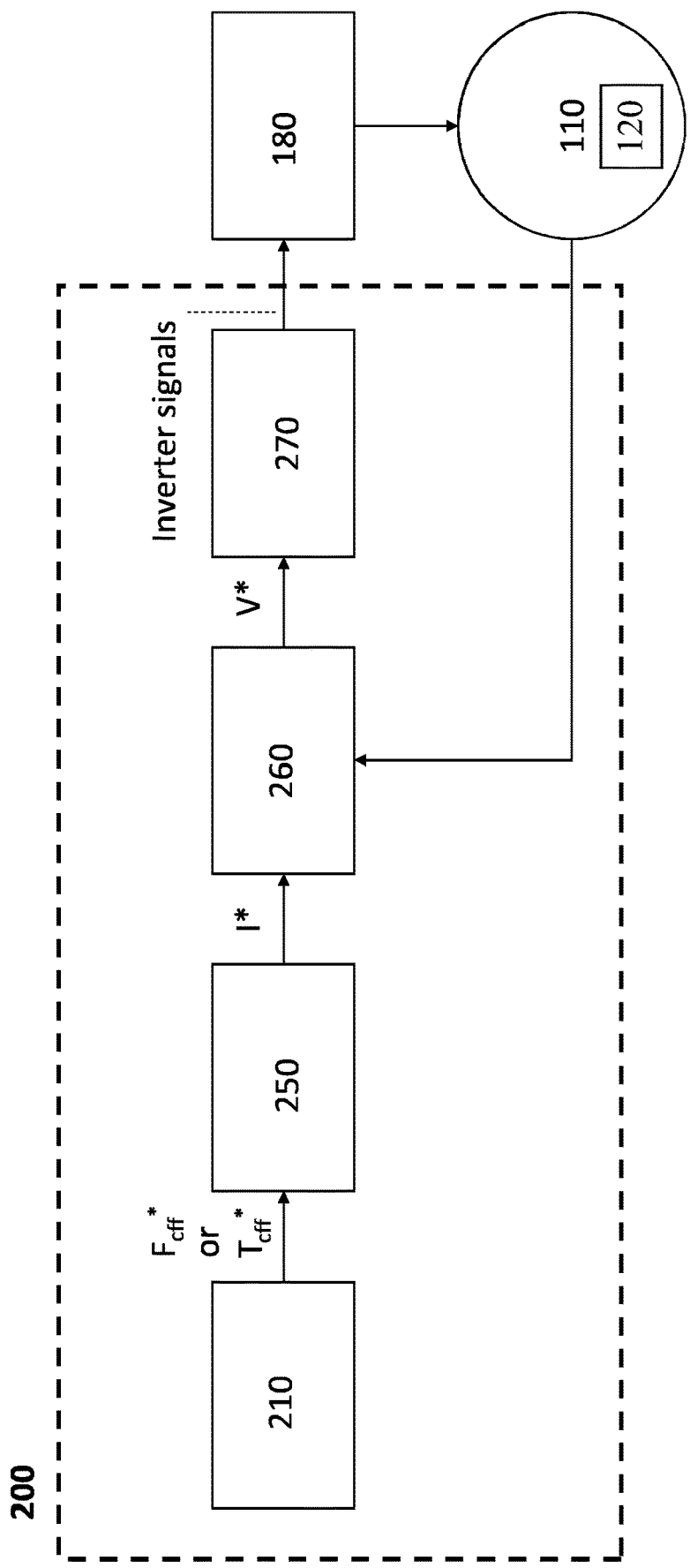
FIG. 1 shows a block diagram of a control scheme of a contact actuating unit according to embodiments of the disclosure.

Hereinafter, the principle and spirit of the present disclosure will be described with reference to the illustrative embodiments. It should be understood that all of these embodiments are given merely for the skilled in the art to better understand and further practice the present disclosure, but not for limiting the scope of the present disclosure. For example, features illustrated or described as part of one embodiment may be used with another embodiment to yield still a further embodiment.

In the interest of clarity, not all features of an actual implementation are described in this specification. It will of course be appreciated that in the development of any such actual embodiment, numerous implementation-specific decisions should be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art.

No special definition of a term or phrase, i.e. a definition that is different from the ordinary and customary meaning as understood by those skilled in the art, is intended to be implied by consistent usage of the term or phrase herein. To the extent that a term or phrase is intended to have a special meaning, i.e. a meaning other than that understood by skilled artisans, such a special definition will be expressly set forth in the specification in a definitional manner that directly and unequivocally provides the special definition for the term or phrase.

The present disclosure seeks to improve currently known switching systems and may provide an improved operating mechanism of a medium to high voltage circuit breaker. The interruption capability of a circuit breaker may strongly be influenced by a travel curve of a contact motion in a contact arrangement in the circuit breaker, which may affect the pressure in different compartments of the breaker chamber and the position of the contacts where an electrical arc is burning as result of a switching operation.

A motor driven actuator as proposed may provide the possibility to directly control the travel curve(s) of the contact arrangement. This may allow to design optimal interruption capability. Given that contact motion may occur on a time scale of tens of milliseconds, a fast and precise control strategy is of paramount importance.

The present disclosure proposes a novel control scheme to overcome the previously discussed drawbacks by introducing a command feedforward implementation that directly takes as input a desired travel curve of the contacts in the contact arrangement of the circuit breaker and may generate a force and/or torque reference.

An embodiment of the present disclosure may therefore provide a contact actuating unit for an electrical circuit breaker. The contact actuating unit may comprise an electro-mechanical device 110. The electro-mechanical device 110 may have an actuator 120. The actuator 120 of the electric electro-mechanical device 110 may be connected to a contact arrangement in the electrical circuit breaker.

The contact actuating unit may further have a control unit 200 which may be configured to control the electro-mechanical device 110 to move the actuator and to bring the contact arrangement from a first to a second position.

The contact actuating unit according to the present disclosure may further have a motion trajectory and feed forward controller block 210. The motion trajectory and feed forward controller block 210 may be configured to provide one or more data signals, wherein at least one of the provided data signals is indicative of a predetermined force and/or torque value, adapted to command the control unit 200 to move the contact arrangement with the actuator to a predetermined position.

FIG. 1 shows an example embodiment of such a system. Block 210 constitutes a command Feed Forward Function. This command feed forward block 210 may output values representing a desired force or torque value. (In this example e.g., $F_{cff}^*$ for a force value and e.g., $T_{cff}^*$ for a torque value). These values may be provided by a storage memory and/or a Look-Up table, connected to or contained in the command feed forward block 210.

These values may be read into a second block 250. This second block 250 may generate a further signal value, in this example, but not limited to, a current value $I^*$ which may be further processed.

Block 250 may be referred to as a "Force/torque to current mapping" block. In other words, force or torque values (e.g., force/torque reference values) from the command feed forward block are "mapped" to specific current (or any other signal containing respective information) values, which may represent the desired force/torque value. As has been noted, block 250 may also be adapted to output values of any form, e.g., a voltage value, which may correspond to the force/torque values.

The mapping may be realized by processing the values (e.g., $F_{\mathit{cff}}$* and/or $T_{\mathit{cff}}$*) from the block 210 by means of an algorithm or they may be taken from a look-up table in which a specific value (e.g., current or voltage) is assigned to a force/torque value.

In the example of FIG. 1, the current value (e.g., I*, but this may not be considered as restricting) may be fed into a block 260. This block may comprise a current control to the following blocks, e.g., PWM block 270. The block 260 may be adapted to generate a signal, a voltage V* in this example, from the values coming from the block 250. The signal may not be restricted to a voltage signal—it may be a current signal or any suitable data signal.

However, the signal may be adapted to provide suitable information for generating a modulated signal, in particular a pulse width modulated signal, as shown in FIG. 1 in a block 270 for performing PWM, i.e. block 270 may generate one or more pulse width modulated signals, each having a specific duty cycle.

The signals from the PWM block 270, in particular the one or more pulse modulated signals, are adapted to control e.g., switching elements (semiconductor switches) in a voltage source inverter 180. The voltage source inverter 180 is connected with the electro-mechanical device 110. The voltage source inverter 180 may be adapted to command the electro-mechanical device 110, in particular an actuator in the electro-mechanical device 110, to move to a specific predetermined position. The PWM signals allow that the switches in the voltage source inverter are operated in a way that, in the electro-mechanical device 110, a specific and predetermined magnetic field is set which generates a desired torque or force on the actuator which drives the actuator in a specific position.

It has to be noted that the position may be reached in one embodiment without a feedback from the actuator. The "information" from the desired torque/force, coming from the command feed forward controller or the motion trajectory command feed forward controller 210, may be sufficient to assume that in a "healthy" circuit breaker with an intact contact arrangement the actuator may be set to the desired position in a predetermined time.

"Predetermined time" may mean that, by means of experiments, the torque/force command has been adjusted with a specific contact arrangement, until a specific behavior has been achieved. These force/torque values, probably together with ambient data (temperature, gas pressure etc.) may have been stored in a storage area of any of the blocks for later use.

Such a position may be a predetermined rotation angle in the case that the electro-mechanical device 110 is an electric motor with a rotor as actor. Such a position may also be a specific excitation of an armature or a translator, in the case that the electric drive is a solenoid or a linear motor. The electro-mechanical device 110 in FIG. 1 may only serve as an example device and may represent any of the aforementioned drives. This predetermined position of the actuator of the electro-mechanical device 110 corresponds to a specific position of the contacts in the contact arrangement in the circuit breaker. In other words, a specific position of the actuator corresponds to a specific position of the contacts in the contact arrangement.

Another embodiment of the present disclosure, which may be combined with other embodiments, proposes that the force and/or torque value from the motion trajectory and feed forward controller 210 may correspond to at least one desired travel curve of the contact arrangement in the electrical circuit breaker.

Another embodiment of the present disclosure, which may be combined with other embodiments, proposes that the desired force and/or torque values may be derived from a system model. The system model may represent one or more mechanical and/or electrical parameters of the contact actuating unit and/or of the electrical circuit breaker. The system model may also represent one or more travel curves, e.g., for different ambient conditions or different sets of contacts.

The system model may have various levels of complexity, which may be explicitly included in the feed forward controller or provided as a lookup table which may be pre-computed by simulation tools known to the inventors. The look-up table may be part of the feed forward controller.

The model or its parameters can also be adapted to cover changing operation conditions. Such a type of operation may be a nominal operation, which means making or breaking of nominal currents. Another type of operation may be a fault interruption. In this case, the changing operation conditions may be a specific type of fault (e.g., based on current/voltage (I/V) measurements).

Other changing operation conditions, which may be represented in the system model or in its parameters, may be wear/fatigue conditions. Wear conditions mean that material may suffer from wear or fatigue during a long operation time. These conditions may be based on a history of faults or on measurements of specific sensors (optical sensors, current sensors and the like) which may be adapted to recognize e.g., wear or fatigue of mechanical parts.

Other conditions which may influence the parameters and/or one or more of the system models, may comprise at least one of nozzle wear, friction, e.g., friction between mechanical parts, a switching-gas composition, ambient conditions like temperature, chamber pressure.

During operation of the circuit breaker, disturbances and inaccuracies around the pre-computed values may arise. The feedforward input may therefore be supplemented by error-based motion control. The error based control may be capable of compensating for the deviation of the actual load from a feedforward reference.

A motion trajectory and feed forward block 210 may provide references generated from the travel curve to a motion controller 240. Force/torque feedforward output may also be generated by this block. The force/torque feedforward combined with a torque reference output of the motion controller 240 may provide an input to a force/torque-to-current mapping block 250. This block may generate current references for a current controller block 260 which in turn may provide voltage references for a voltage-source inverter 180. A resolver 130 may optionally be used to measure an actuator position, in particular a time dependent actuator position, of the electro-mechanical device 110. A motion estimator block 220 may optionally generate feedback values for the motion controller 240 from the values provided from the resolver 130.

In another embodiment, the system may be configured to learn from previously determined failures or unexpected behavior in the system. Such an unexpected behavior may for instance be a deviation of an expected closing/opening time of the contact arrangement in the circuit breaker due to the force/torque command from, e.g., feedforward block 210 and a closing/opening time, measured by a feedback arrangement.

That is, from the force/torque command, it may for instance be expected that the contacts in the contact arrangement move to their position in e.g., x ms. Feedback however shows that the operation needed x+a ms. This deviation "a" has to be compensated.

The system may then be adapted to take these deviations into account and to update the data of the system models and/or data in the look-up table. This means for instance that in the next operation of the contact arrangement, a different force/torque command will be sent or the same force/torque command is assigned (allocated) a new mapping, e.g., in the force/torque to current mapping block 250.

The update may also incorporate overwriting previously chosen values from the system models or look-up tables and replacing them by values which may again fulfil the expected system behavior e.g., an expected switching time of the contact arrangement in the circuit breaker. Force/torque values may be adaptable. Alternatively, values in the force/torque to current mapping block 250 may be adapted so that the same force/torque values generate different output values of the force/torque to current mapping block 250.

Another embodiment of the present disclosure, which may be combined with other embodiments, proposes that the motion trajectory and feed forward controller 210 may comprise a processing unit and a storage area, wherein the storage area may contain predetermined data. The predetermined data, which also may be referred to as "data sets", may be representative of the force and/or torque values and/or at least one predetermined set of travel curves. Advantageously, at least one force and/or torque data per predetermined set of travel curves may be stored.

Another embodiment of the present disclosure, which may be combined with other embodiments, may propose that the at least one system model may be represented by model data of motion trajectories of one or more example breaking contact arrangements of one or more circuit breakers.

That is, some known types of switches may exist on the market. Each of them may comprise a specific contact arrangement. This contact arrangement may have a specific motion trajectory (travel curve) with a specific behavior/mechanical characteristic, in particular a time span in which the contacts move from a first (e.g., open) to a second (e.g., closed) position in reaction to a specific force/torque value from the force/torque feedback controller. The behavior of each of these types of contact arrangements/switches may be analyzed. A data set, representing the behavior of these switches may be stored as data values/characteristic curve (a data set) in the storage area.

Any used system model may be represented by such a curve. In other words: the storage area may have a number of different motion trajectories stored which can be taken as the system model. Based on the switching behavior, the controller 200 may choose the appropriate system model from the plurality of stored curves.

Another embodiment of the present disclosure, which may be combined with other embodiments, may propose that the motion trajectory and feed forward controller 210 may be in communication with one or more sensors. The one or more sensors (not shown in the figures), may be configured to measure one or more values.

The values may represent a state, e.g., a health state, of the contact arrangement or the electric circuit breaker. The values may be one or more of a group: a composition of a gas (e.g., insulation or quenching gas) in the electrical circuit breaker chamber, one or more temperatures in the electrical circuit breaker chamber.

Another embodiment of the contact actuating unit for an electrical circuit breaker, which may be combined with other embodiments, may propose that the one or more sensors may be configured to further measure values which may be of a group consisting of: an ambient temperature, humidity inside and/or outside the circuit breaker, a number of switching operations of the contact arrangement in the circuit breaker; a system current over the contact arrangement; a switching time of the recent switching operations, a gas pressure in the electrical circuit breaker.

Another embodiment of the contact actuating unit for an electrical circuit breaker, which may be combined with other embodiments, may propose that the motion trajectory and feed forward controller 210 may be configured to determine the one or more predetermined force and/or torque values (e.g., $F_{cff}^*/T_{cff}^*$) as a function of the one or more sensor values.

The motion trajectory and feed forward controller 210 may further be configured to provide respective force and/or torque values to the control unit 200, based on the sensor values—i.e., the motion trajectory and feed forward controller 210 may calculate in the processing unit which of the data or data sets, stored in the storage area, may correspond to the measured values.

For example, if a specific temperature value may be measured from e.g., a temperature sensor, the processing unit may determine that a higher/lower force/torque value may be chosen to achieve a required switching behaviour. In another example, if, for instance a recent switching operation showed a deviation in switching time due to e.g., wear of moving parts, the processing unit may decide to choose an appropriate force/torque value for the next operation.

In the latter case however, the system may decide to update the parameters for the system models and/or in the respective look up tables, since in the latter case wear is not reversible as mechanical wear/fatigue will not improve over time.

The controller may be configured to calculate and pick single force/torque values or the controller may further be configured to choose one of the travel curves from system models.

Such a travel curve may be linked with a complete data set of force/torque values. In this case, the motion trajectory and feed forward controller 210 may not have to calculate the values. The controller may pick (without calculation) from a chosen travel curve the force/torque values which may correspond to specific measured values.

The difference is that in the latter case, a calculation may not be necessary. This means that less processing capacity may be required. However, it may happen that the system models do not fulfill the needs for an expected switching behavior anymore. This may happen, for instance, in the case of wear/fatigue (mechanical) or other issues like e.g., extreme ambient temperatures.

In this case, the controller 210 may rely on calculating its own force/torque values. In particular, a feedback from the actuating unit, in particular movement data from the actor may be taken as a reference, since the movement of the actuator is directly related to the switching operation.

Another embodiment of the present disclosure, which may be combined with other embodiments, may propose that the motion trajectory and feed forward controller 210 is configured to determine the one or more predetermined force and/or torque values from the storage area in any of the blocks, based on at least one of the values of the group: date of a past and/or planned maintenance; age of contact arrangement; age of electrical circuit breaker; a history of switching operations.

In other words, if, for instance, maintenance has been performed and perhaps parts in the circuit breaker (e.g., contacts) have been replaced, a force/torque value, previously chosen to achieve a specific switching behavior, may need to be changed, since the new parts have no mechanical wear. The contact actuating unit may therefore be configured to receive information about for instance a performed maintenance so that force/torque values may be chosen by the respective controller which correspond to the switching behavior with the replaced (new) parts.

Another embodiment of the present disclosure, which may be combined with other embodiments, may propose that the motion trajectory and feed forward controller 210 may be configured to be able to self-adapt values, e.g., in the storage area of any of the blocks, of force and/or torque in case of an unexpected switching behaviour of the contact arrangement.

Another embodiment of the present disclosure, which may be combined with other embodiments, proposes that the motion trajectory and feed forward controller 210 may be configured to determine the one or more predetermined travel curves or a combination thereof from the storage area as a function of the one or more sensor values and to make the respective force and/or torque values represented by the at least one set of travel curves, available at an output of the motion trajectory and feed forward controller 210.

Another embodiment of the present disclosure, which may be combined with other embodiments, proposes that the processing unit in the motion trajectory and feed forward controller 210 may be configured to adapt (update) data values in the storage area based on a comparison between an expected behaviour of the contact arrangement according to the force and/or torque value and a measured, time dependent behaviour of the actuator of the electro-mechanical device 110 or a measured time dependent behaviour of the travel curve of the contact arrangement. In other words, the processing unit in the motion trajectory and feed forward controller 210 may autonomously detect and correct deviations in the behaviour. New and updated values, e.g., for force and/or torque may be autonomously written in the storage area.

The storage areas in the disclosure may be of the non-volatile and re-writable type. An operator may be notified of any update operation on the storage area that has been performed.

Another embodiment of the present disclosure, which may be combined with other embodiments, may propose that the motion trajectory and feed forward controller 210 may be configured to determine force and/or torque values, in particular for a currently active system model for updating the current system model.

This may be based on a deviation between an expected behaviour of the travel curve of the contact arrangement in the circuit breaker and a measured behaviour of the travel curve of the contact arrangement. Corrected values for the force and/or torque values and/or values for the system model may be calculated and stored as corrected values in the storage area. This embodiment may be similar to the "self-update" function of one of the previous embodiments.

Another embodiment of the present disclosure, which may be combined with other embodiments, may propose that the electro-mechanical device 110 is a rotary electrical machine, e.g., an AC (Alternating Current), a BLDC (Brushless Direct Current) motor, a stepper motor (similar to a BLDC), or a linear motor or a solenoid. The actuator may be a rotor of the rotary electrical machine or a translator of the linear motor or an armature of the solenoid.

A linear motor may be considered as an electric motor that has had its stator and rotor "unrolled", thus, instead of producing a torque (rotation), it produces a linear force along its length. Therefore, the motion trajectory and feed forward controller 210 may output a force-value. However, linear motors are not necessarily straight. Linear motors may provide a high acceleration along its actuator. Linear motors may have a similar coil configuration as a rotary machine.

Therefore, control with the commonly known voltage source inverter with e.g., space vector PWM is possible. Space Vector Pulse Width Modulation (SVPWM) is a modulation scheme used to apply a given voltage vector to an electric drive (e.g., three-phased with a permanent magnet or induction machine).

Another embodiment of the present disclosure, which may be combined with other embodiments, proposes that the actuator may be directly coupled to the contact arrangement or the actuator may be coupled to the contact arrangement with a kinematic chain or the actuator may be coupled to the contact arrangement with a gear. A direct coupling between the actuator and the contacts in the contact arrangement minimizes a switching delay.

It may be advantageous to use a linear motor such as electric device 110, since motion is linear and simplifies the movement of the contacts in the contact arrangement. This saves mass (less moving parts) and inertia may therefore be reduced which allows for faster switching/reduction of force (or torque) value.

Another embodiment of the present disclosure, which may be combined with other embodiments, may propose that the contact actuating unit for an electrical circuit breaker may further comprise a feedback controller, configured to provide additional force and/or torque values to block 250. Another embodiment of the present disclosure, which may be combined with other embodiments, may propose that the feedback controller may be configured to receive motion data from the electro-mechanical device 110 and provide force and/or torque based on a deviation between the motion data and the travel curve.

Figure 2:
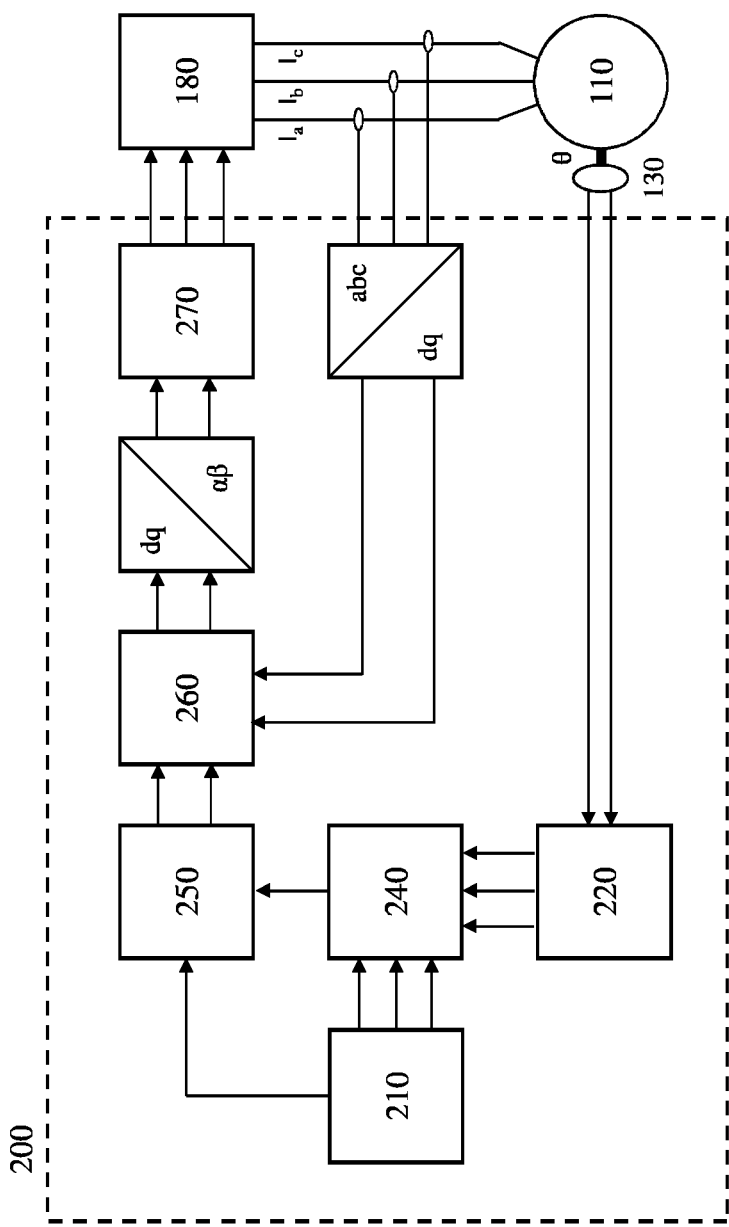
FIG. 2 shows a block diagram according to embodiments of the disclosure.

In FIG. 2, a further example embodiment of the disclosure with feedback control is provided. The Motion Trajectory and Command Feed Forward (CFF) block 210, besides providing the force/torque feedforward values, may also provide travel curve control references to the motion controller block 240.

The references may comprise of one or more values, depending on the kind of electric drive. The motion controller block provides, in combination with feedback information from the actuator, e.g., a reference torque/force value $T_{fb}/F_{fb}$ to the torque/force mapping block 250 and the force/torque mapping block may provide corrected output values to block 260.

In the case of a rotary machine, the travel curve references may comprise angle values and their time derivatives, e.g., a travel control reference angle $\theta^*$, a travel control reference speed $\omega^*$, a travel control reference angle acceleration $\alpha^*$. For a linear motor, the references may comprise the time derivates of the excitation of the translator.

The force/torque to current mapping block 250 may convert a total force/torque input to corresponding values, e.g., direct quadrature (d-q) reference currents ($I_d^*$ and $I_q^*$). An output of a current controller block 260 may be fed to the motor via a Voltage Source Inverter controlled by Space Vector Pulse Width Modulation (SVPWM). The values calculated and provided by the current controller block 260 may comprise, in a non limiting way, one or more parameters like voltage values $V_d/V_q$.

Said feedback controller may not appear as a single block. A motion estimator block 220, a motion controller block 240 and a resolver 130 may be considered to represent (in any combination) the feedback controller. They may also be combined in one single function block. From the actuator of the electro-mechanical device 110, time dependent motion data may be measured with the resolver 130, like, for instance, $\sin(\theta)$ and $\cos(\theta)$, representative for the angular position of the rotor of the electro-mechanical device 110 in the case that the electric machine is a rotary machine.

Respective motion data may also be provided in the case of a translator of a linear motor or the armature of a solenoid. The resolver 130, connected to the electro-mechanical device 110, may be adapted to measure and provide such values as one or more feedback parameter values.

In the case of a linear motor, this may be the time dependent position of the actuator (translator) of the linear motor and/or for instance speed/acceleration of the actuator (translator). The same may apply to the armature of a solenoid. In the case of a rotor of a rotary machine, such values may be an angle, angular speed, or angular acceleration.

Another embodiment of the present disclosure, which may be combined with other embodiments, may propose that the motion data provided to the feedback controller 220, 230, 240 may be a function of data from one or more sensors and/or may be estimated from a system model.

The motion estimation controller 220 is configured to determine one or more of a group of values: an angle or a position of the actuator of the electro-mechanical device 110 (e.g., angle $\hat{\theta}$), a velocity of the actuator, e.g., an angular velocity (e.g., angular speed $\hat{\omega}$) in the case that the actuator is a rotor in a rotating machine, an acceleration of the actuator, e.g., an angular acceleration (e.g., angular acceleration $\alpha$), in the case that the actuator is a rotor in a rotating machine. Respective values in the case of an actuator of a linear motor may be provided as well. One or all of the aforementioned values may be instantaneous values.

It has to be noted that time dependent position values of the actuator do not necessarily need to employ resolver 130. The current and voltage may also be used to estimate a group of motion values, e.g., position, speed and/or acceleration. Another possibility is to use another position measurement device such as an encoder.

A further possibility which may be used to determine the position of the actuator of the electro-mechanical device 110 may comprise that the current to the electro-mechanical device 110 may contain so-called "ripples". This is linked to the fact that most of the electro-mechanical devices 110 have permanent magnets in the actuator. (Separately excited electro-mechanical device are not considered here). The "Ripple count" method relies on measuring current fluctuations in one of the power supply wires to the electric drive 110. Another method for determining a position of an actuator may be transient counting, which is based on measuring voltage transients generated by the moving actuator.

Both latter methods would not necessarily need a specific resolver 130, coupled with the actuator. Position determination is nevertheless possible with many possible combinations of methods/sensors within the motion estimation block 220 or elsewhere in the feedback control.

Another embodiment of the present disclosure, which may be combined with other embodiments, may propose that the controller 200 may comprise transformation blocks (Clarke/Park transformation) to transform three phased currents of the electric drive into direct and quadrature components ($\hat{I}d, \hat{I}q$). The controller 200 may also comprise a transformation block (see FIG. 2) to perform an inverse of said transformation.

Another embodiment of the present disclosure, which may be combined with other embodiments, may propose that the one or more values calculated and provided by the motion controller 240 may comprise at least a reference force/torque value. The reference force/torque value may be provided to "force/torque to current mapping block" 250 (FIG. 2) and may be used to correct errors determined by the feedback controller.

Figure 3:
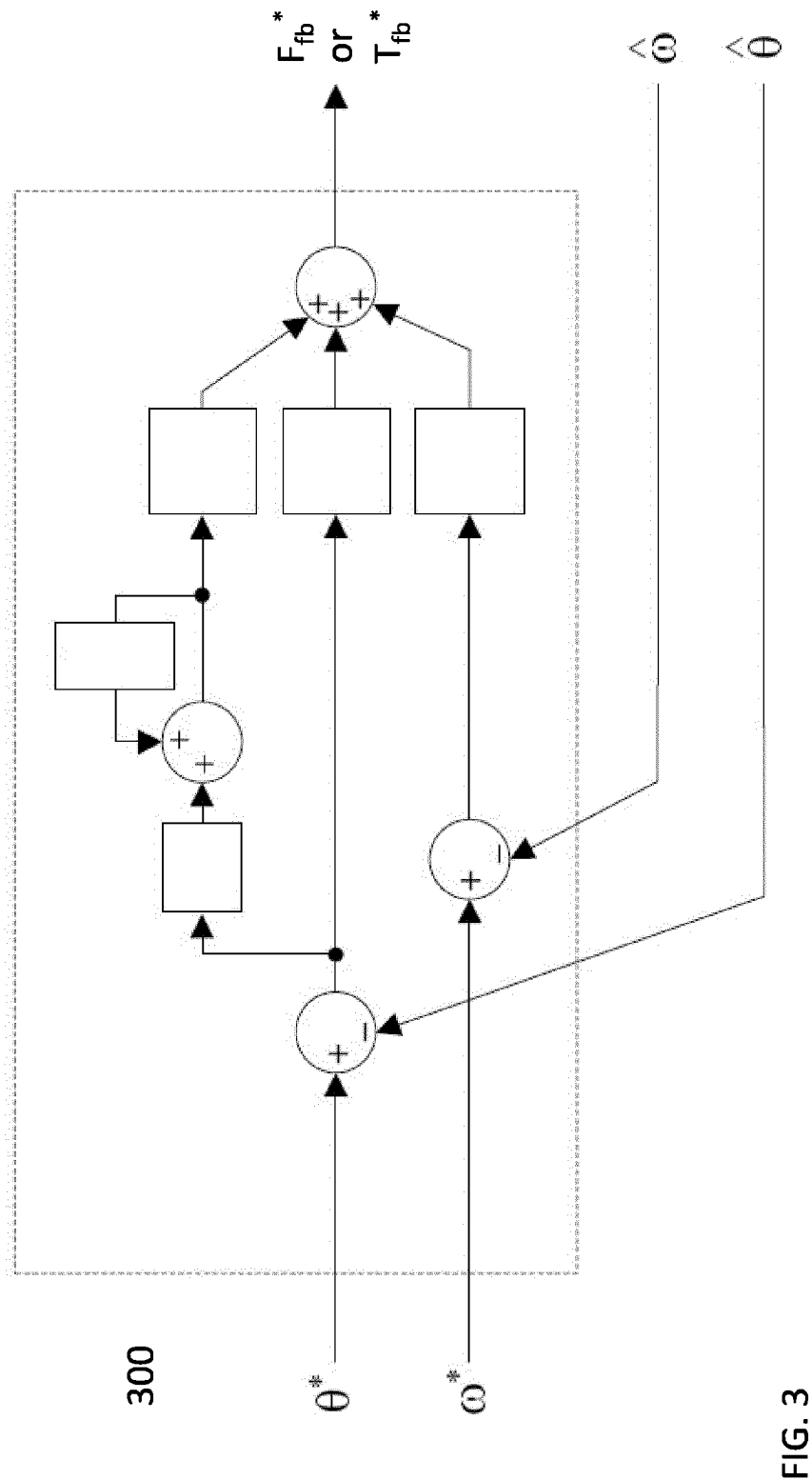
FIG. 3 shows an embodiment of a motion controller according to one or more embodiments of the present disclosure.

FIG. 3 shows an example embodiment 300 of the motion controller 240. In this example embodiment, speed and position reference inputs from the motion trajectory and command feed forward block 210 and estimated speed and position feedback from the motion estimator block 220 are used as input. An acceleration value of the actuator is not employed in this example embodiment.

Another embodiment of the present disclosure, which may be combined with other embodiments, may propose that the motion trajectory and feed forward controller 210 may comprise a command feed forward block and wherein the force/torque feed forward $F_{cff}*/T_{cff}*$; values may be based on one or more functions containing inertia, viscous damping, dynamic friction or other values, for instance, inertia of the moving parts (mechanical parts) of the contact arrangement or inertia of the kinematic chain.

Figure 4:
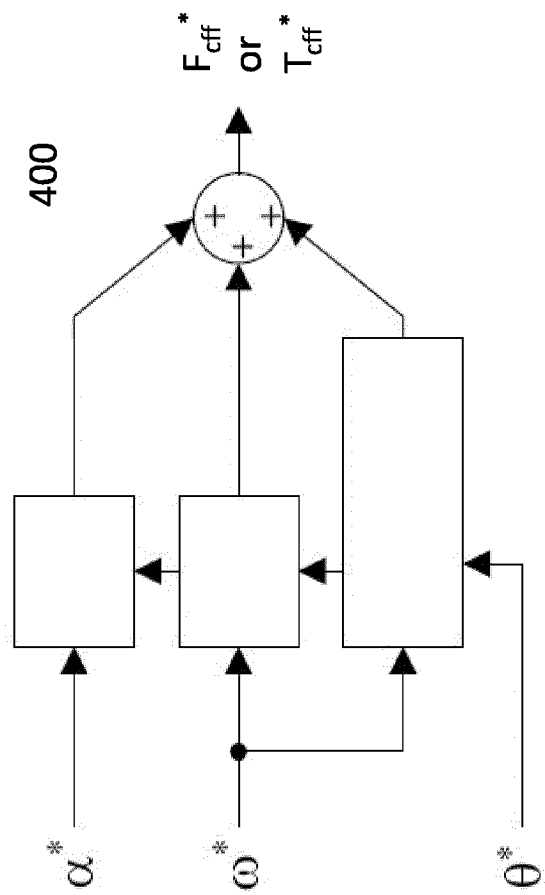
FIG. 4 shows an embodiment of a feed forward controller according to one or more embodiments of the present disclosure.

FIG. 4 shows a non-limiting embodiment 400 of a command feedforward controller based on an example system model containing inertia, viscous damping and dynamic friction. Parameters of this system model may be provided as lookup tables based on a detailed system model of the breaker and may be pre-computed by simulation tools. Other parameters, previously discussed in the present disclosure, may also form a part of the system model.

The command feedforward controller may be an integral part of the motion trajectory and feed forward controller 210.

In an alternative embodiment, the force/torque feed forward value can be provided to the unit 250 directly, based on a lookup table precomputed from the system model. The model or its parameter values can also be adapted to varying operating conditions (as described in detail above). Then, various look-up tables can be provided and interpolation between different tables can be done in one embodiment. In a further embodiment, the system model or a suitable simplification thereof can be embedded in the feedforward controller, for instance, but not limited to, using standardized model containers such as functional mock-up units.

In summary, an improved contact actuating unit for a contact arrangement in a circuit breaker is provided in the present disclosure. The contact arrangement is driven by an electric drive, e.g., a motor. The electro-mechanical device 110 may have an actuator, coupled to the contact arrangement.

A feed forward control is advantageously used to command the electric drive, and the actuator respectively, to move the contact arrangement e.g., from a closed to an open position and vice versa, or any other intermediate positions.

The motion of the contacts can be performed with only values (force/torque) from the feedforward control. Force/torque values are provided by e.g., system models of contact arrangements of available circuit breakers. However, feedback may be employed to give information about the switching operation.

Deviations between an expected behavior and a real behavior may be determined. The optional motion controller compensates discrepancies between the reference values for positioning (travel curve) as well as its derivatives, and the respective measured feedback values. Accurate estimation of position and its derivatives can be realized by an appropriate observer.

The contact actuating unit may be adapted to (autonomously) update/correct force/torque values in storage areas of control blocks of the contact actuating unit, such that a subsequent switching operation may be performed with updated force/torque values.

The invention claimed is:

1. A contact actuating unit for an electrical circuit breaker, the contact actuating unit comprising:
   an electro-mechanical device, wherein an actuator of the electro-mechanical device is configured to be connected to a contact arrangement in the electrical circuit breaker;
   a control unit configured to control the electro-mechanical device to move the actuator and to bring the contact arrangement from a first position to a second position; and
   a motion trajectory and feed forward controller configured to provide one or more data signals, wherein at least one of the provided data signals is indicative of a predetermined force or torque value adapted to command the control unit to move the contact arrangement with the actuator to a predetermined position.

2. The contact actuating unit according to claim 1, wherein
   the predetermined force or torque value from the motion trajectory and feed forward controller corresponds to at least one desired travel curve of the contact arrangement in the electrical circuit breaker or wherein
   the predetermined force or torque values are derived from a system model; wherein
   the system model represents one or more mechanical or electrical parameters of the contact actuating unit or of the electrical circuit breaker or travel curves.

3. The contact actuating unit according to claim 1, wherein
   the motion trajectory and feed forward controller comprises a processing unit and a storage area, wherein
   the storage area contains predetermined data representative of the force or torque values or at least one predetermined set of travel curves.

4. The contact actuating unit according to claim 1, wherein
   at least one system model is represented by model data of motion trajectories of one or more exemplary breaking contact arrangements of one or more circuit breakers.

5. The contact actuating unit according to claim 1, wherein the motion trajectory and feed forward controller is in communication with one or more sensors, the one or more sensors are configured to measure one or more values of a group:
   a composition of gas in an electrical circuit breaker chamber, one or more temperatures in the electrical circuit breaker chamber.

6. The contact actuating unit according to claim 1, wherein one or more sensors are configured to further measure one or more values of a group:
   an ambient temperature, humidity, a number of switching operations of the contact arrangement in the circuit breaker; a system current over the contact arrangement; a switching time of recent switching operations, a gas pressure in the electrical circuit breaker.

7. The contact actuating unit according to claim 1, wherein
   the motion trajectory and feed forward controller is configured to determine the one or more predetermined force or torque values as a function of one or more sensor values and to provide respective force or torque values to the control unit.

8. The contact actuating unit according to claim 1, wherein
   the motion trajectory and feed forward controller is configured to determine the one or more predetermined force or torque values from a storage area based on at least one of values of a group:
   date of a past or planned maintenance; age of contact arrangement; age of electrical circuit breaker; a history of switching operations.

9. The contact actuating unit according to claim 1, wherein
   the motion trajectory and feed forward controller is configured to self-adapt values of force or torque in case of an unexpected switching behaviour of the contact arrangement.

10. The contact actuating unit according to claim 1, wherein
    the motion trajectory and feed forward controller is configured to determine one or more predetermined travel curves or a combination thereof from a storage area as a function of one or more sensor values and to provide respective force or torque values represented by at least one set of travel curves.

11. The contact actuating unit according to claim 1, wherein
    a processing unit in the motion trajectory and feed forward controller is configured to adapt (update) data values in a storage area based on a comparison between an expected behaviour of the contact arrangement according to the force or torque value and a measured time dependent behaviour of the actuator of the electro-mechanical device or a measured time dependent behaviour of the travel curve of the contact arrangement.

12. The contact actuating unit according to claim 1, wherein
    the motion trajectory and feed forward controller is configured to determine force or torque values or values for a system model, based on a deviation between an expected behaviour of the travel curve of the contact arrangement and a measured behaviour of the travel curve of the contact arrangement and to calculate corrected values for the force or torque values or values for the system model and to store the corrected values in the storage area.

13. The contact actuating unit according to claim 1, wherein
    the electro-mechanical device is a rotary electrical machine or a linear motor or a solenoid and
    the actuator is a rotor of the rotary electrical machine or a translator of the linear motor or an armature of the solenoid and wherein
    the actuator is directly coupled to the contact arrangement or the actuator is coupled to the contact arrangement with a kinematic chain or the actuator is coupled to the contact arrangement with a gear.

14. The contact actuating unit according to claim 1, further comprising a feedback controller, configured to provide additional force or torque values to the control unit.

15. The contact actuating unit according to claim 1, wherein
a feedback controller is configured to receive motion data from the electro-mechanical device and provide force or torque based on a deviation between the motion data and the travel curve
or wherein the motion data provided to the feedback controller is a function of data from one or more sensors or is estimated from a system model.

16. A contact actuating unit for an electrical circuit breaker, the contact actuating unit comprising:
an electro-mechanical device, wherein an actuator of the electro-mechanical device is configured to be connected to a contact arrangement in the electrical circuit breaker;
a control unit configured to control the electro-mechanical device to move the actuator and to bring the contact arrangement from a first position to a second position; and
a motion trajectory and feed forward controller configured to provide one or more data signals,
wherein at least one of the provided data signals is indicative of a predetermined force or torque value adapted to command the control unit to move the contact arrangement with the actuator to a predetermined position,
wherein the predetermined force or torque value from the motion trajectory and feed forward controller corresponds to at least one desired travel curve of the contact arrangement in the electrical circuit breaker, or
wherein the predetermined force or torque values are derived from a system model, wherein the system model represents one or more mechanical or electrical parameters of the contact actuating unit or of the electrical circuit breaker or travel curves.

17. The contact actuating unit according to claim 16, wherein the motion trajectory and feed forward controller comprises a processing unit and a storage area,
wherein the storage area contains predetermined data representative of the force or torque values or at least one predetermined set of travel curves.

18. The contact actuating unit according to claim 16, wherein at least one system model is represented by model data of motion trajectories of one or more exemplary breaking contact arrangements of one or more circuit breakers, and
wherein the motion trajectory and feed forward controller is in communication with one or more sensors, the one or more sensors are configured to measure one or more values of a group.

19. The contact actuating unit according to claim 16, wherein one or more sensors are configured to further measure one or more values of a group:
an ambient temperature, humidity, a number of switching operations of the contact arrangement in the circuit breaker; a system current over the contact arrangement; a switching time of recent switching operations, a gas pressure in the electrical circuit breaker, and
wherein the motion trajectory and feed forward controller is configured to determine one or more predetermined force or torque values as a function of one or more sensor values and to provide respective force or torque values to the control unit.

20. The contact actuating unit according to claim 19, wherein the motion trajectory and feed forward controller is configured to determine the one or more predetermined force or torque values from the storage area based on at least one of values of a group:
date of a past or planned maintenance; age of contact arrangement; age of electrical circuit breaker; a history of switching operations.

* * * * *